United States Patent [19]

Fauth, Sr. et al.

[11] Patent Number: 4,926,999
[45] Date of Patent: May 22, 1990

[54] RIGHT ANGLE FLOW-THROUGH JUMP TRANSFER CONVEYOR SYSTEM

[75] Inventors: Frederick E. Fauth, Sr., Towson; Paul E. Barkley, Sykesville, both of Md.

[73] Assignee: American Bottlers Equipment Co., Inc., Owings Mills, Md.

[21] Appl. No.: 344,805

[22] Filed: Apr. 28, 1989

Related U.S. Application Data

[63] Continuation of Ser. No. 129,189, Dec. 7, 1987, abandoned, which is a continuation-in-part of Ser. No. 76,183, Jul. 15, 1987, abandoned.

[51] Int. Cl.⁵ .............................................. B65G 43/08
[52] U.S. Cl. ..................................... 198/358; 198/368; 198/372; 198/463.3
[58] Field of Search ............... 198/372, 368, 356, 358, 198/457, 369, 809, 463.3, 781

[56] References Cited

U.S. PATENT DOCUMENTS

| | | | |
|---|---|---|---|
| 744,874 | 7/1901 | Neeland | 198/457 |
| 1,931,628 | 10/1933 | Von Reis | 49/3 |
| 1,980,261 | 11/1934 | Fenton | 80/44 |
| 3,087,597 | 4/1963 | Jeddeloh | 198/448 |
| 3,134,476 | 6/1964 | Pierson et al. | 198/457 |
| 3,493,095 | 2/1970 | Messerly | 198/463.3 X |
| 3,587,818 | 6/1971 | Hansen | 198/368 |
| 3,608,698 | 9/1971 | Crall | 198/358 X |
| 3,645,305 | 2/1972 | Warlop | 198/368 X |
| 3,756,374 | 9/1973 | Burt et al. | 198/358 X |
| 3,822,777 | 7/1974 | Jepsen | 198/457 |
| 4,109,781 | 8/1978 | Moons | 198/485 |
| 4,256,222 | 3/1981 | Gunti | 198/457 |
| 4,331,228 | 5/1982 | Galarowie | 198/781 X |
| 4,541,520 | 9/1985 | Greenlee, III | 198/372 |
| 4,730,718 | 3/1988 | Fazio et al. | 198/372 |
| 4,733,772 | 3/1988 | Potter | 198/781 |

Primary Examiner—Robert J. Spar
Assistant Examiner—D. Glenn Dayoan
Attorney, Agent, or Firm—Wegner & Bretschneider

[57] ABSTRACT

A right angle flow-through jump transfer conveyor system having a plurality of tensioning strips disposed between a plurality of rollers arranged in a planar array and rails which are sequentially operated by actuator cylinders is disclosed. The strips are raised above the planar array of rollers when a re-direction of the flow of articles through a conveyor system is required. Along the jump transfer conveyor system are a plurality of sensors coupled to a programmable controller for triggering the actuator cylinders responsive to the condition of the flow of articles along various portions of the conveyor.

21 Claims, 7 Drawing Sheets

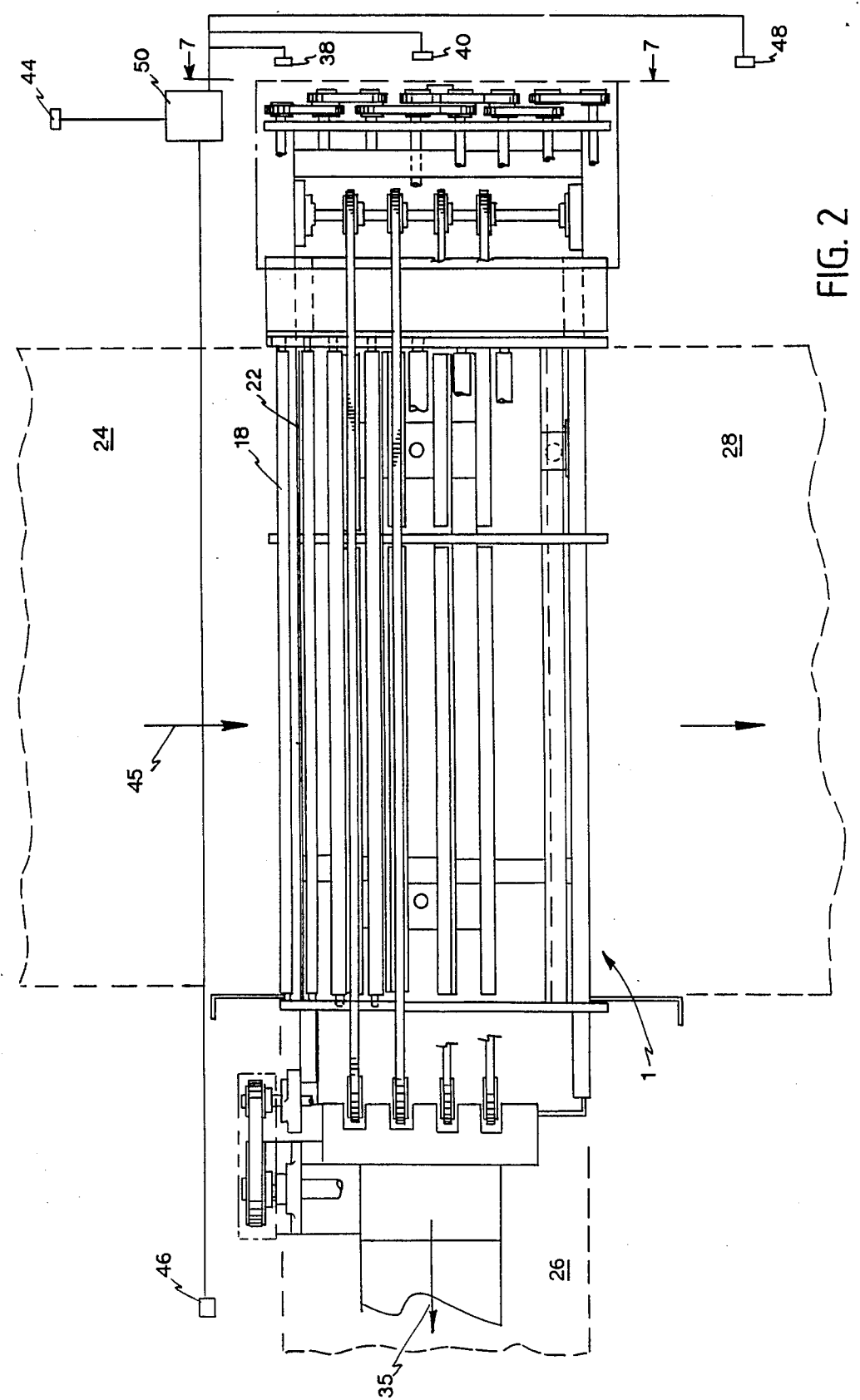

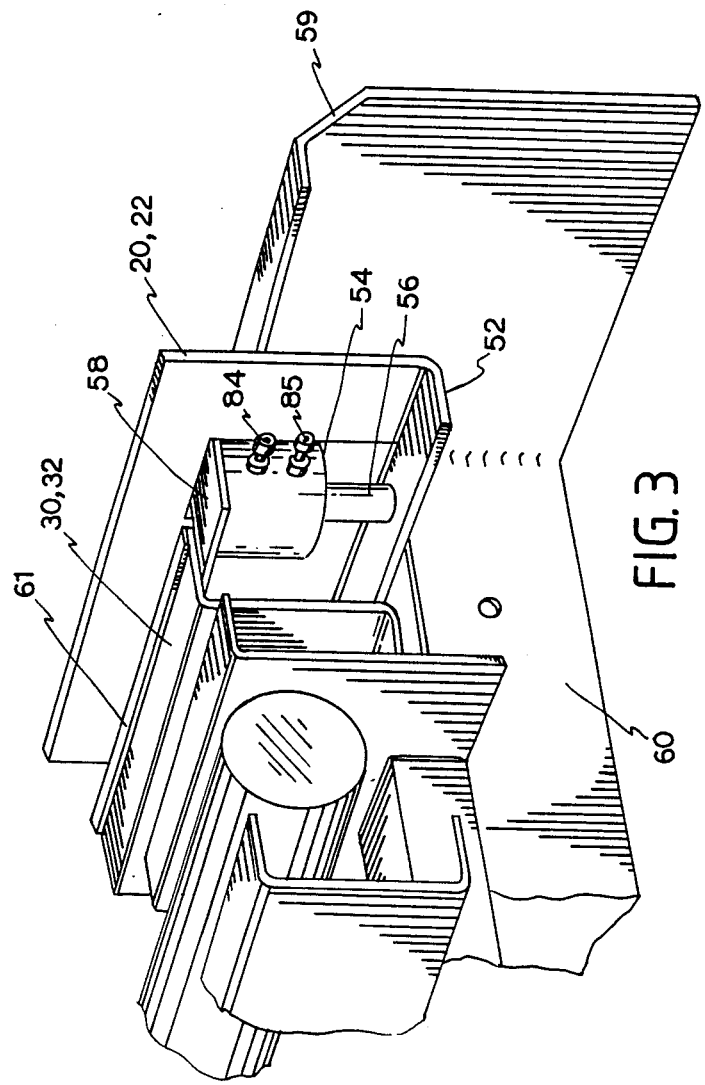

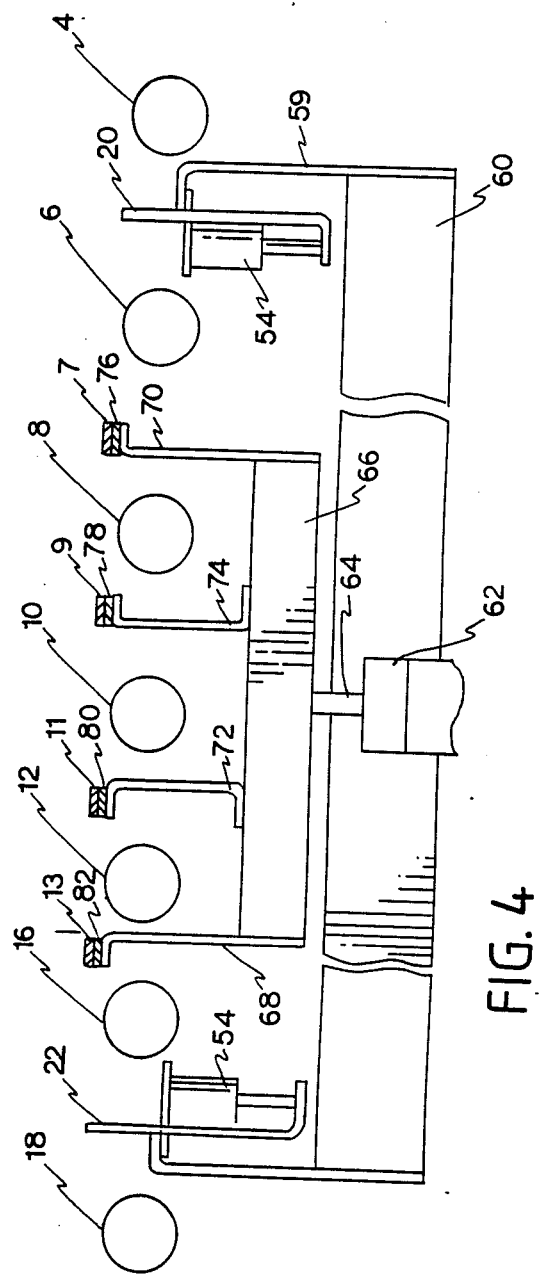

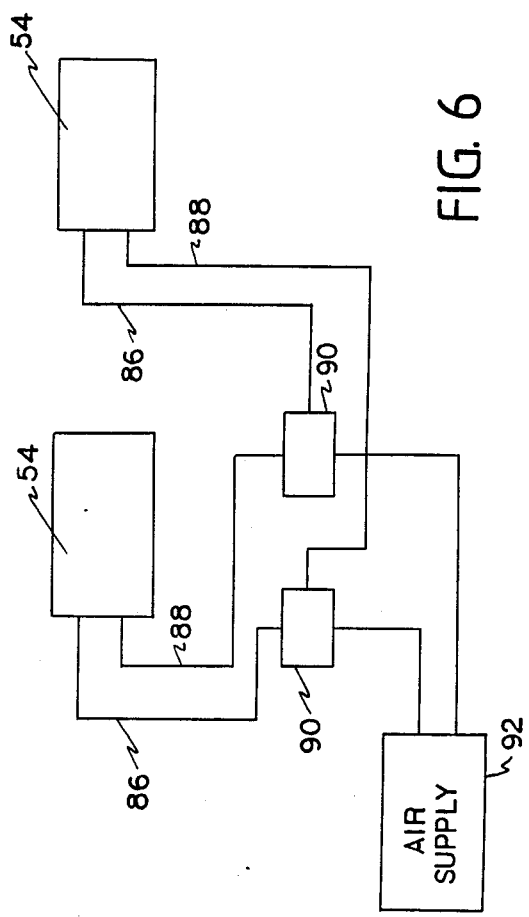

RIGHT ANGLE FLOW-THROUGH JUMP TRANSFER CONVEYOR SYSTEM

CROSS-REFERENCE TO RELATED APPLICATIONS

This application is a continuation of U.S. application Ser. No. 129,189 filed Dec. 7, 1987, now abandoned which is a continuation-in-part of application Ser. No. 076,183, filed July 15, 1987 now abandoned.

BACKGROUND OF THE INVENTION

1. Field of t he Invention

This invention relates to a transfer mechanism and, more particularly, this invention relates to a conveyor right angle transfer mechanism having a plurality of "pop-up" tensioning strips and rails for re-directing the flow of articles on the conveyor. The tensioning strips which are operated by opposing end pulleys are raised while the rails are sequentially raised or lowered for transporting articles in a right angle direction responsive to the condition of the flow of articles along various portions of the conveyor. The flow-through jump transfer system of the present invention is efficient, economical, simply constructed and easily installed.

2. Description of the Relevant Art

U.S. Pat. No. 4,541,520 issued to F. S. Greenlee on Sept. 17, 1985 teaches the vertical movements of the belts by drive sheaves mounted on a common base. The drive sheaves raise the pulleys which support the belts. However, the Greenlee patent lacks the separate raising or tensioning of the belt above the rollers.

U.S. Pat. No. 3,822,777 issued to J. T. Jepsen on July 9, 1974 teaches the tensioning of a band or belt while keeping the end pulleys at their original positions. The tensioning of the belt is accomplished not by a "pop-up" type support member, but by rotatable pulleys which are raised by piston cylinders. However, the Jepsen patent is not even concerned with the use of a tensioned band between conveyor rollers.

U.S. Pat. No. 3,087,597 issued to O. G. Jeddeloh on Aug. 22, 1960 teaches an unloading device for a multi-deck conveyor employing belts which are guided over roller-equipped rails and raised by pivotable links.

SUMMARY OF THE INVENTION

With the foregoing background of this invention in mind, and as the following description of this invention proceeds it will be appreciated that the primary object of the present invention is to provide a right angle flow-through jump transfer mechanism for a conveyor.

It is another primary object of this invention to provide a right angle flow-through jump transfer mechanism for a conveyor which has a plurality of "pop-up" tensioning strips operably disposed between a plurality of rollers in combination with "pop-up" rails which sequentially operate at opposing sides of the transfer mechanism.

It is a further object of this invention to provide a right angle flow-through jump transfer mechanism for a conveyor which can be rapidly and easily installed in a conveyor system.

It is still another object of this invention to provide a right angle flow-through jump transfer mechanism for a conveyor which receives articles to be transferred at a predetermined parameter relative to the flow of the articles along the conveyor.

The right angle flow-through jump transfer conveyor mechanism of the present invention is used for diverting the flow of articles along a conveyor in a direction at right angles to the flow. The transfer mechanism comprises a plurality of tensioning strips seated on lubricated support members which are raised or lowered and operate in sequence with "pop-up" rails that selectively allow or block off entry of the articles to the transfer mechanism. The flow of the article is monitored by a plurality of sensors with a programmable controller placed along the jump transfer and the conveyor for sequentially operating the strips and rails responsive to the condition of the flow of articles along various portions of the conveyor.

BRIEF DESCRIPTION OF THE DRAWINGS

FIG. 2 is a partial diagrammatic top view of the right angle flow-through jump transfer cf FIG. 1, including a schematic view of associated sensors operably coupled to a programmable controller;

FIG. 3 is a perspective view showing at least one "pop-up" rail coupled to an actuator cylinder with an adjoining brace member;

FIG. 4 is a partial cross-sectional view taken along lines 4—4 of FIG. 1 showing the manner in which the actuator cylinders raise or lower the tensioning strips and rails;

FIG. 6 is a schematic view of the actuator cylinders of the rails operably connected to dual air-line members coupled to an air supply.

DESCRIPTION OF THE PREFERRED EMBODIMENTS

Figure 1:
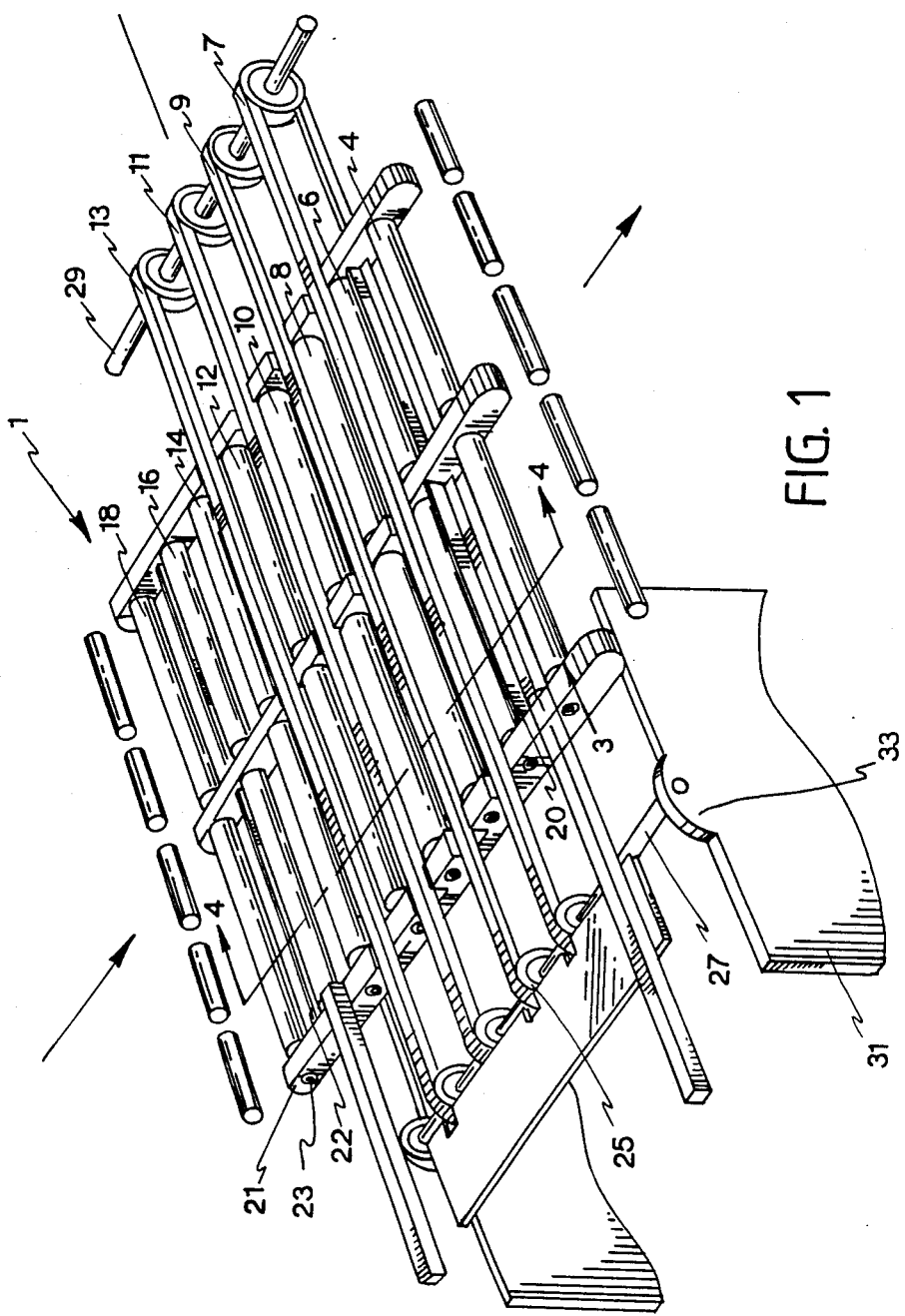
FIG. 1 is a perspective view of a right angle flow-through jump transfer according to the present invention, including an illustration of an associated conveyor operably joined thereto.

Attention is first directed to FIG. 1 which shows a right angle flow-through jump transfer of the present invention, generally referred to by reference number 1. The jump transfer 1 has rollers 4, 6, 8, 10, 12, 14, 16 and 18. Interposed between rollers 6, 8, 10, 12 and 14 are V-shaped belts or tensioning strips 7, 9, 11 and 13. Between rollers 4 and 6 is rail 20 while rail 22 is positioned between rollers 16 and 18.

Roller 18 is preferably a low pressure type roller; i.e., when the rail 22 is raised, the low pressure roller 18 stops rotating as a result of the weight of the article thereon. Thus, articles accumulate without damage to the articles. All the rollers are preferably mounted on self-aligning bearing blocks 21 with bronze bushings 23.

The tensioning strips are operably mounted on pulleys 25 which are in turn mounted on shafts 27, 29 on opposing ends thereof. The shafts 27, 29 are mounted on a base 31 having bearing block 33, preferably having a bronze bushing. Shaft 29 is preferably free-wheeling, while one end of shaft 27 is preferably coupled to a conventional drive mechanism (not shown) for turning pulleys 25. The pulleys 25 consequently rotate the strips for carrying articles in the direction of arrow 35 while the strips are in the raised position.

In FIG. 2, an input portion 24 of the conveyor is provided for moving articles in the direction towards the flow-through jump transfer 1 while output portions 26 and 28 are alternative output portions for directing flows out of the jump transfer 1. The path taken out of the jump transfer 1, i.e., either output portion 26 or 28, is determined by the condition of the flow of articles along various portions of the conveyor which will later be discussed. Preferably the ratio between the article velocity on conveyor portions 24, 28 and the article velocity along the rollers is 1:2. Thus, in order to have a smooth transition for the travelling articles between the jump transfer 1 and the conveyor portions 24 and 28, relatively wide gaps between rollers 4 and 6, as well as between rollers 14, 16 and 18 are provided.

Alongside the jump transfer 1 and preferably disposed between rail 22 and roller 18 is an article sensor 38. Between rails 20 and 22 is disposed an article sensor 40 which is preferably a reflector-type capable of sensing across opposing angles defined by the rectangular configuration of the jump transfer 1.

Article sensors 44, 46 and 48 are located near conveyor portions 24, 26 and 28, respectively. Sensors 38, 40, 44, 46 and 48 are connected to a programmable controller (PC) 50.

As shown in FIG. 3, abutting rail 20 or 22 is brace member 30 or 32. Each of rails 20, 22, preferably has an L-shaped configuration having the bottom portion 52 coupled to at least one actuator cylinder 54 with a plunger 56 which protrudes downward. The actuator cylinder 54 is attached to a frame portion 58 connected to side frame 59.

FIG. 3 further illustrates either brace member 30 or 32 coupled to lower frame 60 which is in turn connected to side frame 59. Each brace member 30, 32 has a channel-shaped plastic sleeve 61 coupled thereto to prevent abrasions occurring on the rails 20, 22.

In FIG. 4, another actuator cylinder 62 is coupled to the lower frame 60. Attached to the plunger 64 of the actuator cylinder 62 is a horizontal support member 66 having inverted L-shaped members 68 and 70 attached thereto for supporting tensioning strips 7 and 13, respectively. Coupled above the intermediate portion of the horizontal support member 66 are C-shaped members 72, 74 for supporting tensioning strips 9 and 11. Mounted between the tensioning strips 7, 9, 11 and 13 and the members 68, 70, 72 and 74, are lubricated members 76, 78, 80 and 82, respectively. The lubricated members 76, 78, 80 and 82 are manufactured by, for example, Nolu-S Company of Pennsylvania. The side surfaces of the edges of the lubricated members 76, 78, 80 and 82 which abut the strips 7, 9, 11 and 13 are preferably chamfered for providing relaxation to the sloping portions of the strips directly abutting the end pulleys (not shown).

Figure 5A:
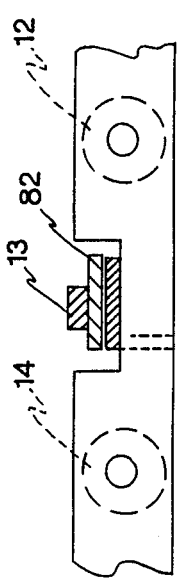
FIGS. 5a and 5b are partial diagrammatic views respectively showing the raised and lowered positions of a tensioning strip relative to adjoining rollers.
Figure 5B:
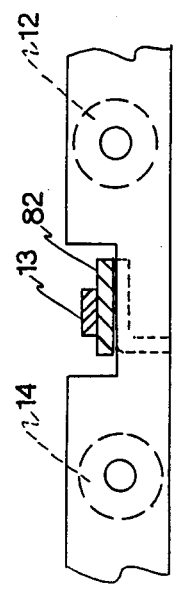

As shown in FIG. 5a, when the tensioning strip 13, for example, is raised, its upper surface is above the top surfaces of the adjoining rollers 12 and 14, thereby allowing the articles being transported to be carried along by the strips. When the tensioning strip 13 is lowered, as illustrated in FIG. 5b, its upper surface is below the top surfaces of the adjoining rollers 12 and 14 which consequently permit the rollers 12 and 14 to transport the articles.

In FIG. 6, a schematic view of the actuator cylinders 54 for operating the rails 20, 22 is shown. Each rail 20 or 22 has at least two cylinders 54 at opposing ends thereof (see, FIG. 3 showing one end of rail 20). Cylinders 54 are double acting actuator cylinders having inlet 84 and outlet 85 (see, FIG. 3) which connect to inlet 86 and outlet 88 lines. The inlet line 86 and outlet line 88 are coupled to dual air-line members 90 which, in turn, are coupled to an air supply 92. The double acting actuator cylinders 54 are coupled to 4-way solenoid valves (not shown) which, in turn, are joined to the PC 50.

The PC 50 is programmed to detect by means of article sensor 44 the accumulation of articles flowing towards the jump transfer 1. When sensor 38 detects articles, rail 22 is lowered. When sensor 40 detects articles on the strips 7, 9, , 13, rail 20 is raised. The PC 50 is programmed for a time delay between the lowering of rail 22 by cylinders 54 and the raising of the strips 7, 9, 11, 13 by cylinder 62 in order for articles to be transported to the conveyor portion 26 located perpendicular to conveyor portion 24.

Initially, the flow of articles s from conveyor portion 24 to conveyor portion 26, as shown by arrows 35, 45.

When sensor 46 detects an accumulation of articles along conveyor portion 26, the flow of articles is generally directed to conveyor portion 28. That is, the strips 7, 9, 11, 13 and rail 20 are lowered as shown in FIG. 5b, in order to permit the rollers 4, 6, 8, 10, 12, 14, 16, 18 to transport the articles to the conveyor portion 28.

Similarly, if the initial flow of articles is from conveyor portion 24 to conveyor portion 28, as shown by arrow 45, sensor 44 can detect accumulation of articles on conveyor portion 24. Once accumulation of articles is detected by sensor 44, the strips and rail 20 are raised, thereby diverting the flow of the articles toward conveyor portion 26, as shown by arrow 35.

Figure 7:
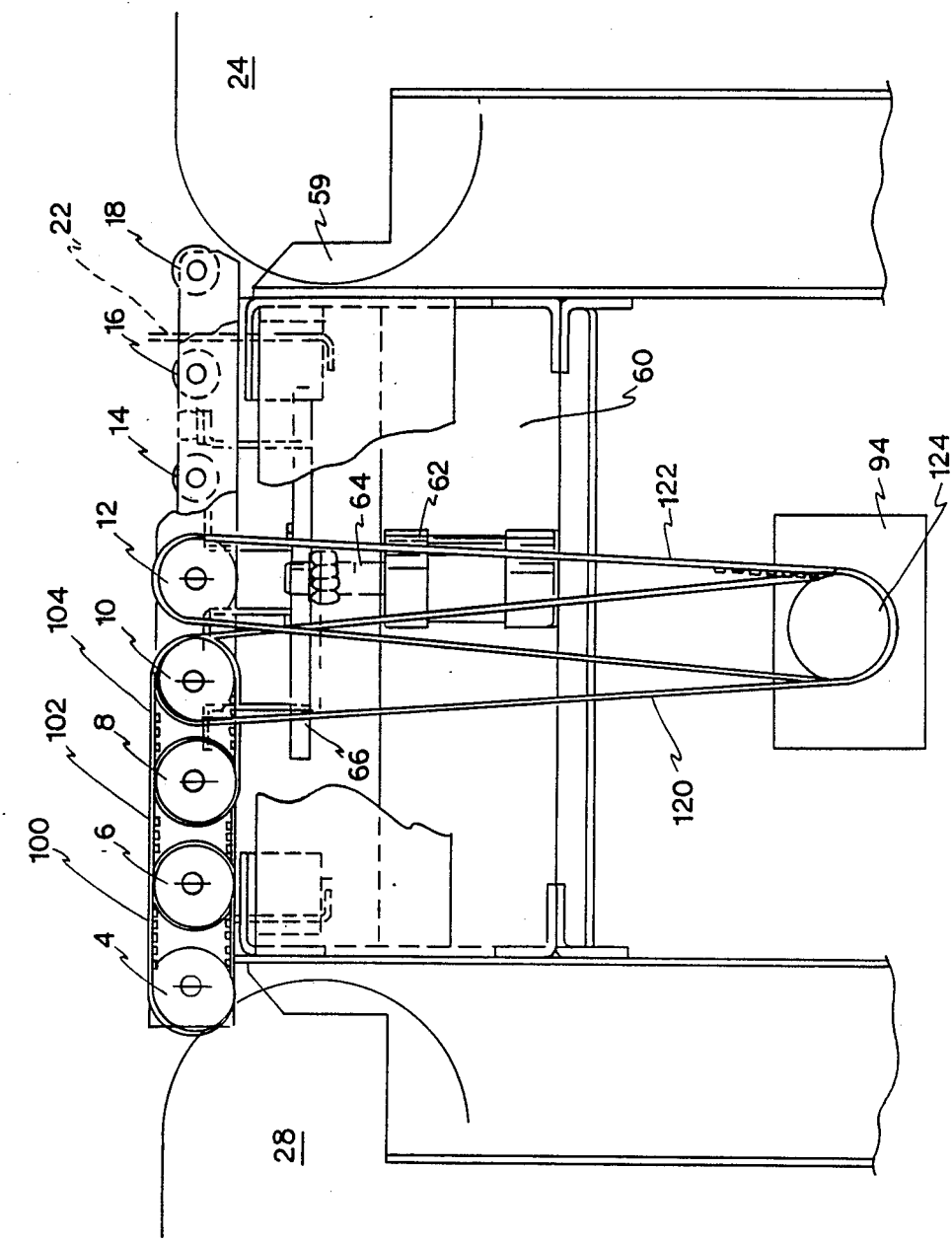
FIG. 7 is a side view showing the manner in which a series of rollers interposed between the strips are driven.

Shown in FIG. 7 is a schematic view of the manner in which the rollers 4, 6, 8, 10, 13, 14, 16, 18 are driven by motor 94. Joined to roller 6 are belts 100 and 102 for operably coupling to rollers 4 and 8, respectively. Belt 102 similarly couples roller 6 to roller 8, while belt 104 joins roller 8 to roller 10. A belt (not shown) couples roller 10 to roller 12, while another belt (not shown) joins roller 12 to roller 14. Rollers 14 and 16 are joined by still another belt (not shown), while rollers 16 and 18 are coupled by yet another belt (not shown). Joined to pulley 124 of motor 94 are rollers 10 and 12 by belts 120 and 122, respectively. The aforementioned arrangement provides for a compact series of rollers effectively driven by a single motor 94. Although the belts have been referred to as being joined to the rollers, it should be understood that the belts are joined to pulleys which are coupled to the rollers.

The invention has been particularly illustrated as being a jump transfer capable of diverting articles along conveyor portions 26 and 28. It should be understood that the invention can also function with the above-described jump transfer in conjunction with another jump transfer mechanism solely for diverting the articles at a right angle direction at the end flow of conveyor portion 28.

While the invention has been particularly shown and described in reference to preferred embodiments thereof, it will be understood by those skilled in the art that changes in form and details may be made therein without departing from the spirit and scope of the invention.

I claim:

1. A right angle jump transfer for a conveyor system, said right angle jump transfer having a plurality of parallel rollers disposed in a planar array, comprising:

(A) a plurality of flexible strips interposed between said rollers each of said flexible strips being supported at its ends by a pair of end pulleys, said end pulleys being disposed outside the ends of said rollers;

(B) a first support member means supporting each of said plurality of flexible strips for tensioning, raising and lowering said strips, said first support member means being disposed between said pair of end pulleys and comprising:
  (1) an elongated solid lubricant strip means to directly receive said flexible strip thereon,
  (2) a shaped member directly mounted below said lubricant strip means, and
  (3) a first actuator cylinder for moving the shaped members upwards or downwards, whereby said plurality of flexible strips are raised and lowered relative to and independent from said end pulleys;

(C) first driving means for driving said plurality of rollers;

(D) second driving means for driving said plurality of strips, at least one of each pair of said end pulleys being operably coupled to said second driving means; and (E) first sensing means for detecting a predetermined condition in the flow of articles along said conveyor system on said right angle jump transfer.

2. A right angle jump transfer as defined in claim 1, further comprising at least one rail means located proximate an edge of said right angle transfer supported by at least one second actuator cylinder for raising and lowering said rail means in sequence with said strips.

3. A right angle jump transfer as defined in claim 2, wherein said first sensing means activates the first and second actuator cylinders.

4. A right angle jump transfer as defined in claim 2, wherein said conveyor comprises:
  (A) an inlet conveyor portion which directs articles towards said right angle jump transfer; and
  (B) first and second outlet conveyor portions which direct articles away from said right angle jump transfer.

5. A right angle jump transfer as defined in claim 4, wherein said first sensing means comprises:
  (A) a first sensor located between said jump transfer and said inlet conveyor portion; and
  (B) a second sensor suitable for detecting the presence of articles on the entire area covered by said right angle jump transfer.

6. A right angle jump transfer as defined in claim 5, further comprising second sensing means which operates along with said first sensing means located along the inlet of first and second conveyor portions for detecting a predetermined condition in the flow of articles thereon.

7. A right angle jump transfer as defined in claim 6, wherein first and second actuator cylinders and said first and second sensing means are operably coupled to a programmable controller means for sequentially raising and lowering the plurality of rail means and strips responsive to a predetermined condition in the flow of articles.

8. A right angle jump transfer as defined in claim 7, wherein said rail means comprises:
  (A) a first rail between said inlet conveyor portion and said right angle jump transfer; and
  (B) a second rail between said right angle jump transfer and said second outlet conveyor portion.

9. A right angle jump transfer as defined in claim 8, wherein said first rail and said second actuator cylinder are activated at a time delay by said programmable controller.

10. A right angle jump transfer as defined in claim 8, wherein the roller closest to said inlet conveyor portion is a low pressure type roller and is disposed outside said first rail, whereby when said first rail is raised, said articles accumulate outside the same and said low pressure roller stops rotating as a result of the weight of an article thereon, thereby preventing damage to said articles.

11. A right angle jump transfer as defined in claim 4 wherein said first outlet conveyor portion is disposed at right angles to said inlet conveyor portion and said second outlet conveyor portion is opposed to said inlet conveyor portion.

12. A right angle jump transfer as defined in claim 1, wherein said end pulleys are operably connected to shafts, and wherein at least one of said shafts is rotated by said second driving means.

13. A right angle jump transfer as defined in claim 12, wherein said shafts are operably mounted in a bushing in a bearing block on a base.

14. A right angle jump transfer as defined in 1, wherein said conveyor comprises:
  (A) an inlet conveyor portion which directs articles towards said right angle jump transfer; and
  (B) first and second outlet conveyor portions which direct articles away from said right angle jump transfer.

15. A right angle jump transfer as defined in claim 14, wherein said first sensing means comprises:
  (A) a first sensor located between said jump transfer and said inlet conveyor portion; and
  (B) a second sensor suitable for detecting the presence of articles on the entire area covered by said right angle jump transfer.

16. A right angle jump transfer as defined in claim 15, further comprising second sensing means which operates along with said first sensing means located along the inlet of first and second conveyor portions for detecting a predetermined condition in the flow of articles thereon.

17. A right angle jump transfer as defined in claim 16, wherein first and second actuator cylinders and said first and second sensing means are operably coupled to a programmable controller means for sequentially raising and lowering the plurality of rail means and strips responsive to a predetermined condition in the flow of articles.

18. A right angle jump transfer as defined in claim 17, wherein said rail means comprises:
  (A) a first rail between said inlet conveyor portion and said right angle jump transfer; and
  (B) a second rail between said right angle jump transfer and said second outlet conveyor portion.

19. A right angle jump transfer as defined in claim 18, wherein said first rail and said second actuator cylinders are activated at a time delay by said programmable controller.

20. A right angle jump transfer as defined in claim 18, wherein the roller closest to said inlet conveyor portion is a low pressure type roller and is disposed outside said first rail whereby when said first rail is raised, said articles accumulate outside the same and said low pressure roller stops rotating as a result of the weight of an article thereon, thereby preventing damage to said articles.

21. A right angle jump transfer as defined in claim 14, wherein said first outlet conveyor portion is disposed at right angles to said inlet conveyor portion and said second cutlet conveyor portion is opposed to said inlet conveyor portion.

* * * * *